(12) United States Patent
De Nardis et al.

(10) Patent No.: US 11,041,659 B2
(45) Date of Patent: Jun. 22, 2021

(54) PROFILE OF PIPING FOR A HEAT EXCHANGER, HEAT EXCHANGER FOR CONDENSATION BOILERS PROVIDING SAID PROFILE, AND CONDENSATION BOILER PROVIDING SAID HEAT EXCHANGER

(71) Applicant: RIELLO S.P.A., Legnago (IT)

(72) Inventors: Marco De Nardis, Legnago (IT); Gianluca Iachini, Legnago (IT)

(73) Assignee: Riello S.P.A., Legnago (IT)

( * ) Notice: Subject to any disclaimer, the term of this patent is extended or adjusted under 35 U.S.C. 154(b) by 317 days.

(21) Appl. No.: 15/738,336

(22) PCT Filed: Jun. 21, 2016

(86) PCT No.: PCT/IT2016/000161
§ 371 (c)(1),
(2) Date: Dec. 20, 2017

(87) PCT Pub. No.: WO2016/207923
PCT Pub. Date: Dec. 29, 2016

(65) Prior Publication Data
US 2018/0172313 A1  Jun. 21, 2018

(30) Foreign Application Priority Data

Jun. 24, 2015 (IT) .......................... 10201500027214

(51) Int. Cl.
*F24H 1/43* (2006.01)
*F24H 1/44* (2006.01)
(Continued)

(52) U.S. Cl.
CPC ................. *F24H 1/43* (2013.01); *F24H 1/16* (2013.01); *F24H 1/445* (2013.01); *F24H 8/006* (2013.01);
(Continued)

(58) Field of Classification Search
CPC ... F24H 1/43; F24H 1/445; F24H 1/16; F24H 8/006; F28D 7/024; F28D 2021/0024;
(Continued)

(56) References Cited

U.S. PATENT DOCUMENTS

| 910,192 A | * | 1/1909 | Grouvelle | F28F 13/12 138/38 |
| 2007/0209606 A1 | * | 9/2007 | Hamada | F24H 1/43 122/18.1 |
| 2016/0146541 A1 | * | 5/2016 | De Nardis | F28D 7/024 165/110 |

FOREIGN PATENT DOCUMENTS

| CN | 1950648 A | 4/2007 |
| EP | 0745813 | 12/1996 |

(Continued)

*Primary Examiner* — Steven S Anderson, II
(74) *Attorney, Agent, or Firm* — Muncy, Geissler, Olds & Lowe, P.C.

(57) ABSTRACT

A profile of piping, particularly for making a heat exchanger for a condensation boiler. The cross-section of the profile has a trapezoidal portion with two bases and two sides, and a triangular portion with a base and two sides. A first side of the trapezoidal portion coincides with the base of the triangular portion. The second side and the bases of the trapezoidal portion and the sides of the triangular portion form the inner walls of the profile. A first angle between the first base of the trapezoidal portion and the first side of the triangular portion adjacent thereto is 45°-135°, preferably 90°. A second angle between the second base of the trapezoidal portion and the second side of the triangular portion adjacent thereto is 180°-270°, preferably 225°. A coiled heat exchanger for condensation boilers providing said profile and a condensation boiler providing said heat exchanger are provided.

13 Claims, 4 Drawing Sheets

(51) Int. Cl.
  *F24H 1/16* (2006.01)
  *F24H 8/00* (2006.01)
  *F28D 7/02* (2006.01)
  *F28F 1/02* (2006.01)
  *F28F 17/00* (2006.01)
  *F28D 21/00* (2006.01)

(52) U.S. Cl.
  CPC ................ F28D 7/024 (2013.01); F28F 1/02 (2013.01); F28F 17/005 (2013.01); *F28D 2021/0024* (2013.01); *Y02B 30/00* (2013.01)

(58) Field of Classification Search
  CPC .... F28D 1/0472; Y02B 30/106; F28F 17/005; F28F 1/02; F28F 1/025; F28F 1/04; F28F 1/045
  See application file for complete search history.

(56) References Cited

FOREIGN PATENT DOCUMENTS

| | | | |
|---|---|---|---|
| EP | 0745813 A2 * | 12/1996 | ................ F28F 1/02 |
| EP | 0745813 A2 | 12/1996 | |
| WO | WO2011/002711 A1 | 1/2011 | |
| WO | WO 2011002711 A1 | 1/2011 | |
| WO | WO 2011064804 A2 | 6/2011 | |

* cited by examiner

PROFILE OF PIPING FOR A HEAT EXCHANGER, HEAT EXCHANGER FOR CONDENSATION BOILERS PROVIDING SAID PROFILE, AND CONDENSATION BOILER PROVIDING SAID HEAT EXCHANGER

The present invention relates to a profile of piping for a heat exchanger, to a heat exchanger providing said profile, and a to a condensation boiler providing the said heat exchanger.

More precisely, the present invention relates to a profile for heat exchanger specially studied to considerably improve the efficiency of the heat exchanger suitably studied therefore and to the condensation boiler providing said heat exchanger.

Generally condensation boilers have a combustion chamber and a condensation chamber, separated each other by a refractory insulating septum. Both chambers are wrapped by a heat exchanger having a serpentine profile in which a fluid to be heated flows.

The fluid to be heated is caused to flow from the area in correspondence of the condensation chamber in correspondence to the zone of the combustion chamber to then be conducted into the heating system.

In correspondence of the combustion chamber there is provided a burner which, when active, is adapted to heat the fluid flowing within the heat exchanger.

In the combustion zone, it occurs a heat exchange with the heat exchanger by radiation and convection, while in the condensation zone the heat exchange occurs by condensation.

The fumes generated by the burner within the combustion chamber in contact with the surface of the exchanger are cooled, condensed, and are transformed into liquid.

During the years several solutions have been suggested for the profile of the coil tubing, in order to improve the efficiency of the coil, and the related condensation boiler in which it provides a heat exchanger with said coil.

In this context it is included the solution suggested according to the present invention having as object a pipe profile for the heat exchanger improved compared with known profiles.

A first object of the present invention is that of providing a profile for piping for a heat exchanger allowing to realize a coil in which there is no gap between the adjacent coils, with "gap" it is meant that there is communication between the interior and the outside of the coil along a transverse section thereof.

A second object of the present invention is that of providing a profile of piping for a coil which allows optimizing the convective exchange.

A further object of the present invention is that of providing a profile of piping for coil which provides a profile, in the fumes output from the combustion zone, so as to allow optimum separation of the fumes from the possible condensation.

A further object of the present invention is that of provide a heat exchanger for condensation boiler which provides said coil, said coil being preferably provided both in the combustion zone and in the condensation zone.

Another object of the present invention is that of providing a condensation boiler which provides said heat exchanger.

It is therefore specific object of the present invention a profile of piping, in particular piping for making a heat exchanger for a condensation boiler, characterized in that the cross-section of the profile has a trapezoidal portion, having two bases and two sides, and a triangular portion, having a base and two sides, wherein a first side of the trapezoidal portion coincides with the base of the triangular portion, wherein the second side and the bases of the trapezoidal portion and the sides of the triangular portion form the inner walls of the profile, wherein a first angle between the first base of the trapezoidal portion and the first side of the triangular portion adjacent to it is comprised between 45° and 135°, preferably 90°, wherein a second angle between the second base of the trapezoidal portion and the second side of the triangular portion adjacent to it is comprised between 180° and 270°, preferably 225°.

Particularly, according to the invention, a third angle between the first base and the second side of the trapezoidal portion can be comprised between 120° and 170°.

Still more particularly, according to the invention, said profile can have the angles smoothed.

It is further object of the invention a coiled heat exchanger comprising the profile described in the above, arranged in spiral so as to comprise a plurality of coils winded up one on the other in respect to a central axis, wherein the first base of the trapezoidal portion of the profile of each coil is tilted with respect to said central axis of a fourth angle comprised between 10° and 60°, preferably of 45°.

Further, according to the invention, said coils can be arranged in such way as to have the second base of the trapezoidal portion of the cross-section of the profile of a first coil parallel to the first base of the trapezoidal portion of the cross-section of the profile of a coil adjacent and separated of a distance comprised between 0.5 mm and 2 mm.

It is still object of the present invention a condensation boiler comprising a heat exchanger as described in the above.

Always according to the invention, Said boiler can comprise a combustion zone, a condensation zone, and a dividing wall between said two zones, in correspondence of said condensation zone said coils can be distanced from said dividing wall of one distance comprised between 0.1 mm and 20 mm.

More particularly, said boiler can comprise an external bundle and each of said coils can be distanced from said external bundle of one distance comprised between 0.1 mm and 20 mm.

Still according to the invention, said boiler can comprise a slotted casing between said external bundle and said heat exchanger in correspondence of said combustion zone and/or of said condensation zone.

Preferably, according to the invention, the height of said combustion zone can be comprised between 30% and 65% of the height of the boiler.

Finally, according to the invention, said boiler can be oriented in such way that the central axis of the heat exchanger is arranged vertically or tilted of an inclination comprised between 4° and 90°.

The invention will be now described, for illustrative but not limitative purposes, with particular reference to the figures of the enclosed drawings, wherein.

Figure 3:
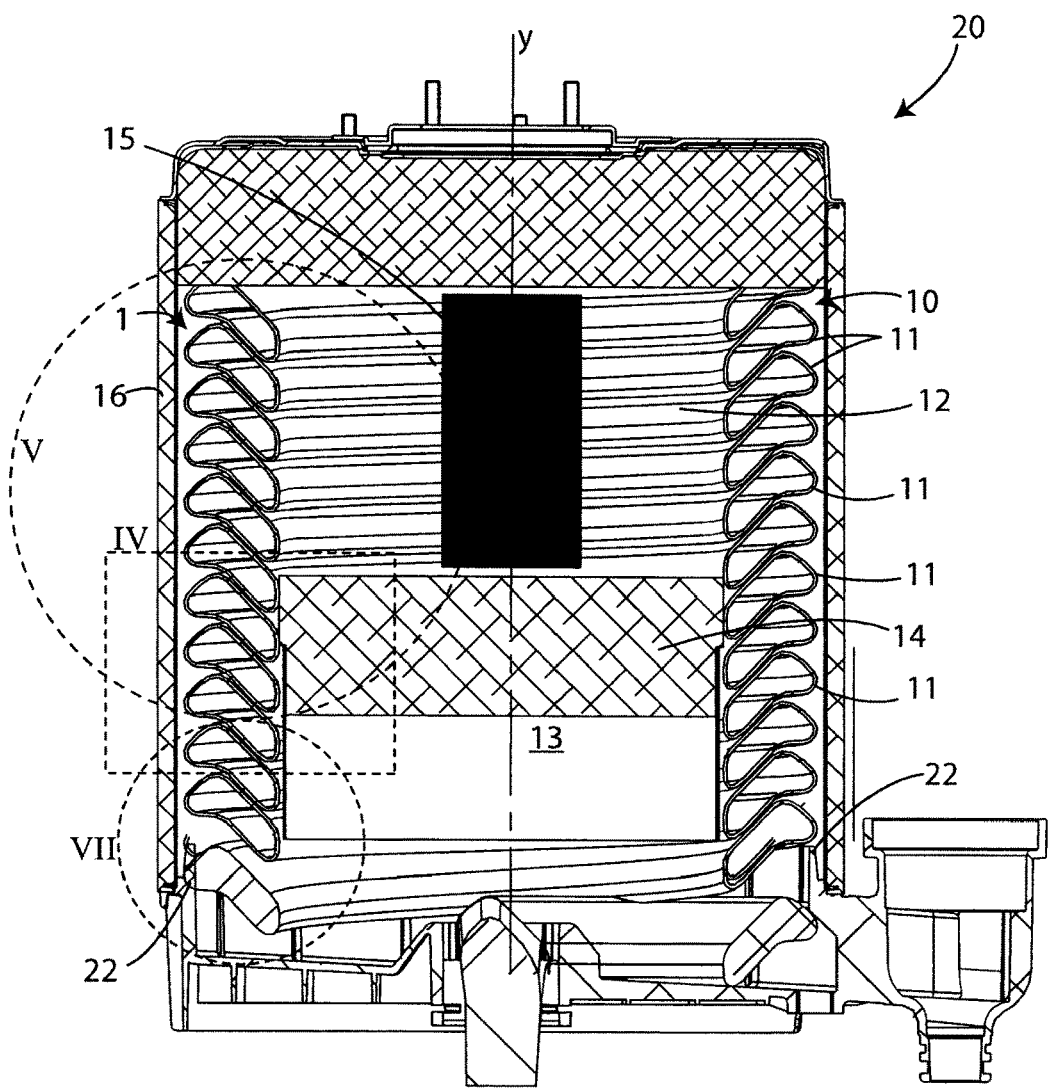
FIG. 3 shows a front section view of a first embodiment of a condensation boiler comprising a heat exchanger according to the invention.
Figure 6A:
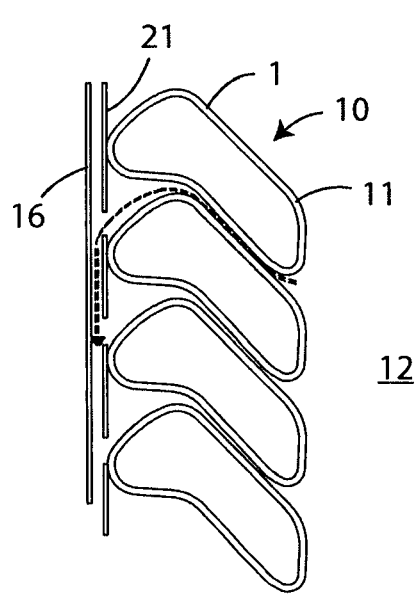
Figure 6B:
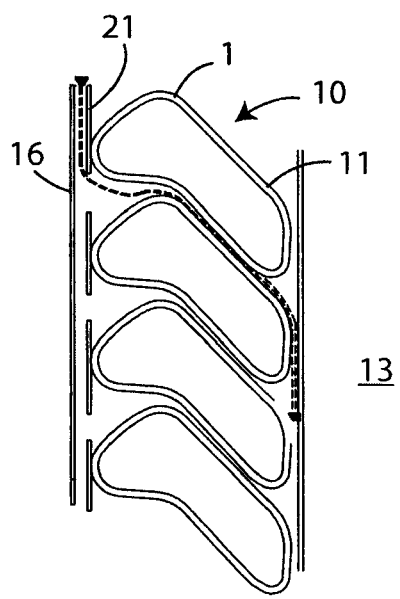
Figure 7:
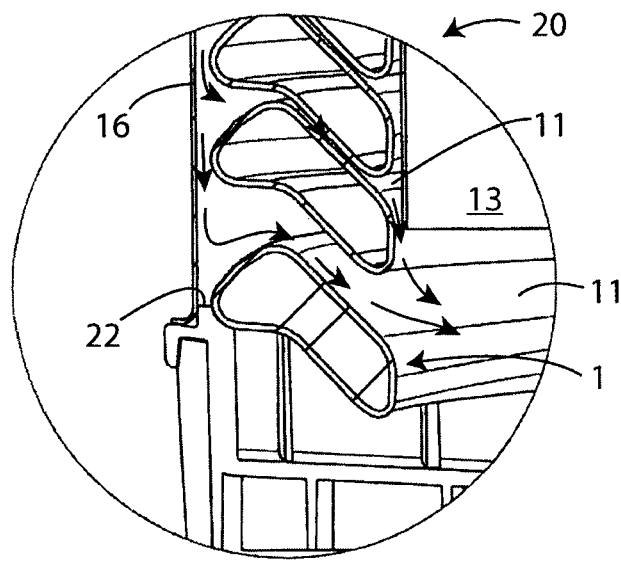
Figure 8:
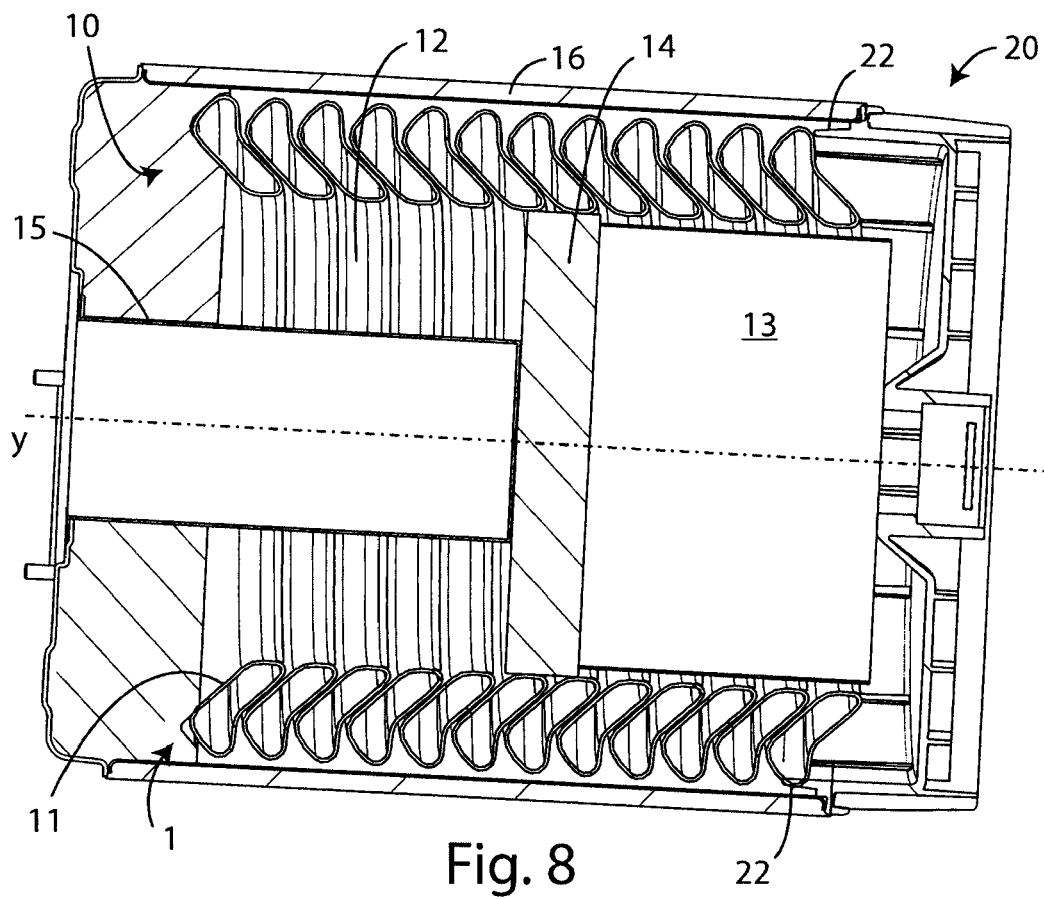

FIG. 6a schematically shows the condensation step of the fumes in contact with the surface of the heat exchanger according to the invention in correspondence of the combustion chamber;

FIG. 6b schematically shows the descent of the condensation liquid in the condensation chamber through the heat exchanger according to the invention;

FIG. 7 shows a third detail VII of FIG. 3 during the condensation phase;

FIG. 8 shows a front section view of a second embodiment of a condensation boiler comprising a heat exchanger according to the invention.

Figure 1:
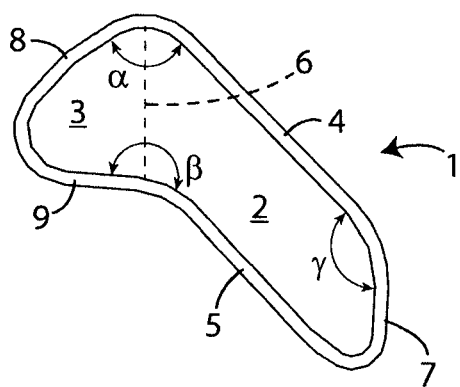
FIG. 1 is a section view of the pipe profile according to the invention.

Making reference to FIG. 1, it is noted the profile of the piping according to the invention indicated by the reference number 1.

The profile 1 according to the invention is particularly suitable to realize a heat exchanger for a condensation boiler, however, it could also be used in other fields.

As it can be observed from FIG. 1, the cross section of the profile 1 has a quadrangular portion 2, in particular a trapezoidal portion, having two parallel sides or bases 4, 5 and two additional sides 6, 7, and a triangular portion 3, having a base 6 and the two sides 8, 9. the first side 6 of the trapezoidal portion 2 coinciding with the base 6 of the triangular portion 3. Particularly, the second side 7 and the bases 4, 5 of the trapezoidal portion and the sides 8, 9 of the triangular portion 3 form the inner walls of the profile 1. The preferred embodiment of the profile 1 according to the invention, has a substantially "P" shaped cross section, in which a first angle α between the first base 4 of the trapezoidal portion 2 and the first side 8 of the triangular portion 3 adjacent to the same is equivalent to about 90°, in which a second angle β between the second base 5 of the trapezoidal portion 2 and the second side 9 of the triangular portion 3 adjacent to the same is equivalent to approximately 225°.

The profile 1 according to the invention has the advantage of always having two opposite sides 4 and 5, always parallel each other, facilitating the superimposition of several profiles 1 one on the other and their interpenetration. Further, if the profile 1 is arranged, as in FIG. 1, so as to have sides 4 and 8 facing upwards, their different angle, allows creating a change of path on the surface of the profile 1.

Other embodiments of the profile 1 according to the invention can be provided, in which the first angle α can be between 45° and 135°, and the second angle β can be between 180° and 270°.

It is evident that, in case the first angle α is 135° and the second angle β is 225°, in other words if the two sides 8 and 9 of the triangular portion 3 are parallel, there would be an imaginary triangular portion 3, that would be necessarily jointed by means of a connecting element. For example in the embodiment of FIG. 1, the corners of the triangular portion 3 and of the trapezoidal portion 2 are beveled and connected by curved connecting portions. In other embodiments not shown it is possible having straight portions.

Furthermore, the profile 1 according to the invention can have a third angle γ between the first base 4 and the second side 7 of the trapezoidal portion ranging between 120° and 170°, preferably equivalent to about 135°.

Figure 2:
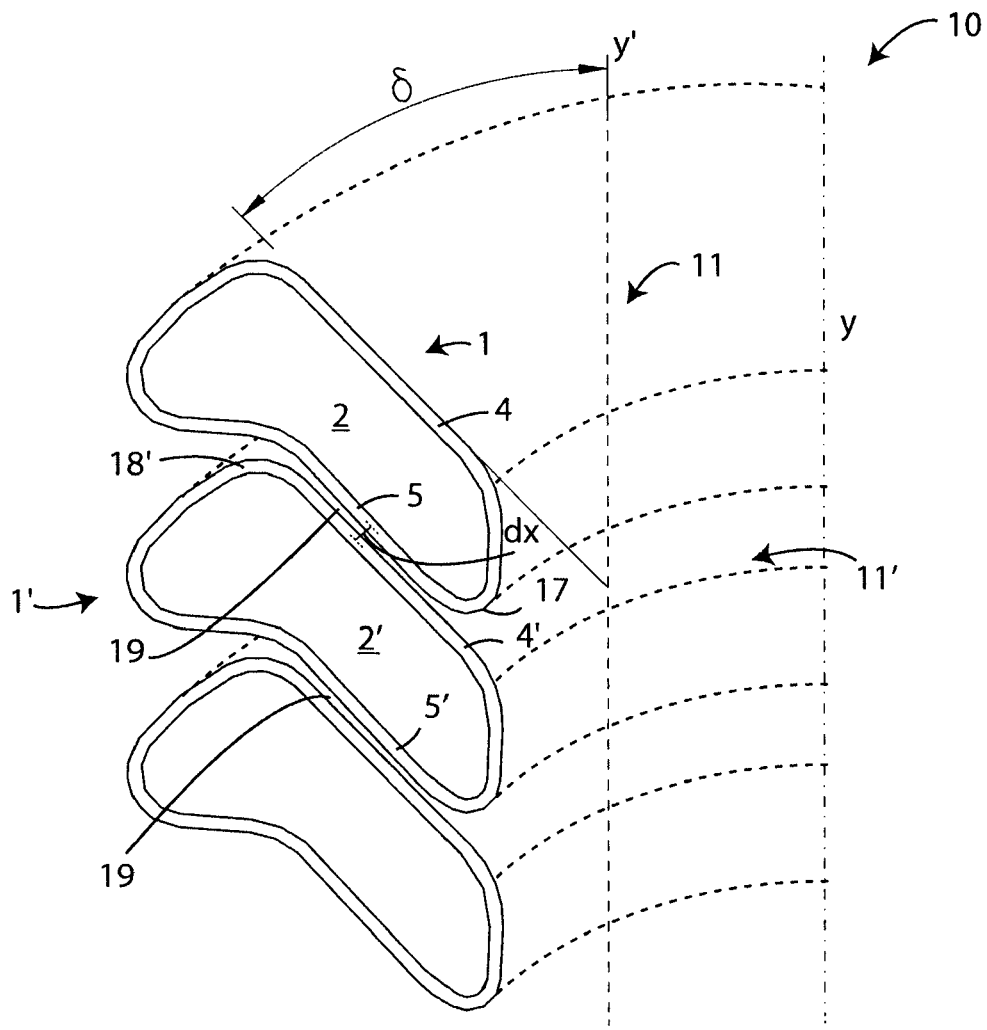
FIG. 2 is a section view of a portion of the heat exchanger with the profile according to the invention.

Referring now to FIG. 2, it is noted a cross section of a heat exchanger obtained by the profile 1 according to the invention and indicated by reference number 10.

Particularly, the heat exchanger 10 according to the invention comprises the profile 1, spirally arranged about a central axis y, in particular a vertical axis, so as to have a plurality of coils 11 wound one over the other with respect to said central axis y. These coils 11 are arranged in such a way as to present the first base 4 of the trapezoidal portion 2 of the profile 1 of each coil 11 inclined with respect to the central axis y of a fourth angle δ ranging between 10° and 60°, preferably about 45° as shown in FIG. 2.

The configuration of the heat exchanger 10 thus obtained allows to channel the combustion gases of a condensation boiler in which the heat exchanger 10 could be inserted, facilitating their ascent, increasing the thermal contact surface and facilitating the descent of eventual condensation liquids formed by the change of angles of the created path.

Particularly, said coils 11 can be spaced one 11 from the other 11' so as to have the basis 4', 5 of the trapezoidal portion 2 and 2' of the cross section of the respective profile 1, 1' between them parallel and spaced apart by a distance dx ranging between 0.5 mm and 2 mm.

This distance is sufficient to form a channel or path 19 for the passage of combustion fumes. Further advantages will be clearer from the description of the embodiment of the boiler comprising the heat exchanger according to the invention.

In FIGS. 3-6 it is shown a first embodiment of a condensation boiler according to the invention indicated by the reference number 20.

Said boiler 20 provides a heat exchanger 10 as described in the above. Particularly, condensation boiler 20 has a combustion zone 12, a condensation zone 13, and a dividing wall 14, preferably comprised of refractory and insulating material, between said two zones 12 and 13. The heat exchanger 10 according to the invention has a profile 1 such as to be advantageous for use both in the combustion zone 12 and in the condensation zone 13. The boiler 20 also comprises, in the combustion zone 12, a burner 15 designed to heat by irradiation the fluid flowing in the heat exchanger 10 and an external casing 16, able to contain the fumes inside the heat exchanger 10.

It is evident that the profile 1 according to the invention has been studied so that the fumes are conveyed in the channel 19 between two successive coils 11 through a converging zone, in which the decrease of section allows to increase the speed of the fumes while crossing the interspace or channel 19 consequently increasing the thermal exchange of convective type. Instead, at the output the opposite occurs, since the diverging zone of channel 19 allows the separation of the fumes from the condensate formed (in some operating conditions, condensation can occur in the inclination change zone), so that the fumes do not have the passage obstructed and therefore not there is not a burden of load losses. The tube profile "P" and the distance between the coils 11 are designed in such a way to maximize the thermal exchange maintaining pressure losses As shown in particular in FIGS. 5 and 6a the angle of the profile 1 with respect to the central axis y of the heat exchanger 10, determined by the fourth angle δ, allows to obtain a difference in height between the lowest point 17 of a coil 11 and the highest point 18' of the next coil 11', located immediately below, in such a way as to prevent that the irradiation light of the burner 15 reaches the outer casing 16. In other words, the overlap of the coils 11 of the heat exchanger 10 according to the invention, it ensures the shielding of the casing 16 from the radiation generated by the burner 15.

Moreover, the difference of gradient that is formed in the channel passage 19 between one coil 11 and the other 11' facilitates, in the ascending portion, the ascent of the combustion fumes and the heat exchange with the heat exchanger surface 10 and, in the descending path, the downward descent, and then towards the condensation zone of the condensate that was formed during the heat exchange of the fume gases with the heat exchanger surface 10, preventing falling into the combustion zone 12.

Preferably the distance dy between the outer casing and the heat exchanger is between 0.1 mm and 20 mm. This advantageously allows the passage of the fume gases which, in contact with the casing 16, they cool and then condense and fall down. In addition, said distance dy also allows the outer portion of the profile 1 to participate in the heat exchange with the combustion fumes.

Furthermore, as shown in FIGS. 6a and 6b, it can be provided a slotted shirt 21 between the casing 16 and the heat exchanger 10, both in correspondence with the combustion zone 12 and of the condensation zone 13 or, in one of them, for obtaining a better distribution of the flow and a better heat exchange. The openings may be constant or variable for a better balancing of the flow.

The shape of the coils 11 profile 1 of the heat exchanger 10 is also advantageous in correspondence with the condensation zone 13, as the condensation liquid is made descending through the channel 19 formed between two coils 11 and 11', thus being countercurrent with respect to the condensate droplet.

The condensation liquid having a higher temperature than the fluid flowing in the heat exchanger 10 allows a preheating of the same through the heat exchange that takes place during its descent towards the condensation zone 13.

Figure 4:
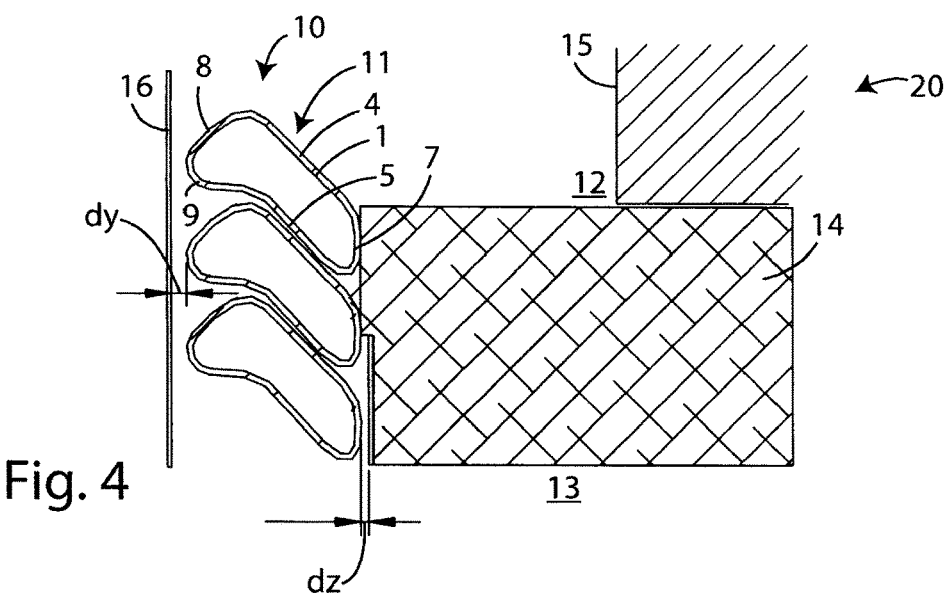
FIG. 4 shows a first detail IV of FIG. 3.
Figure 5:
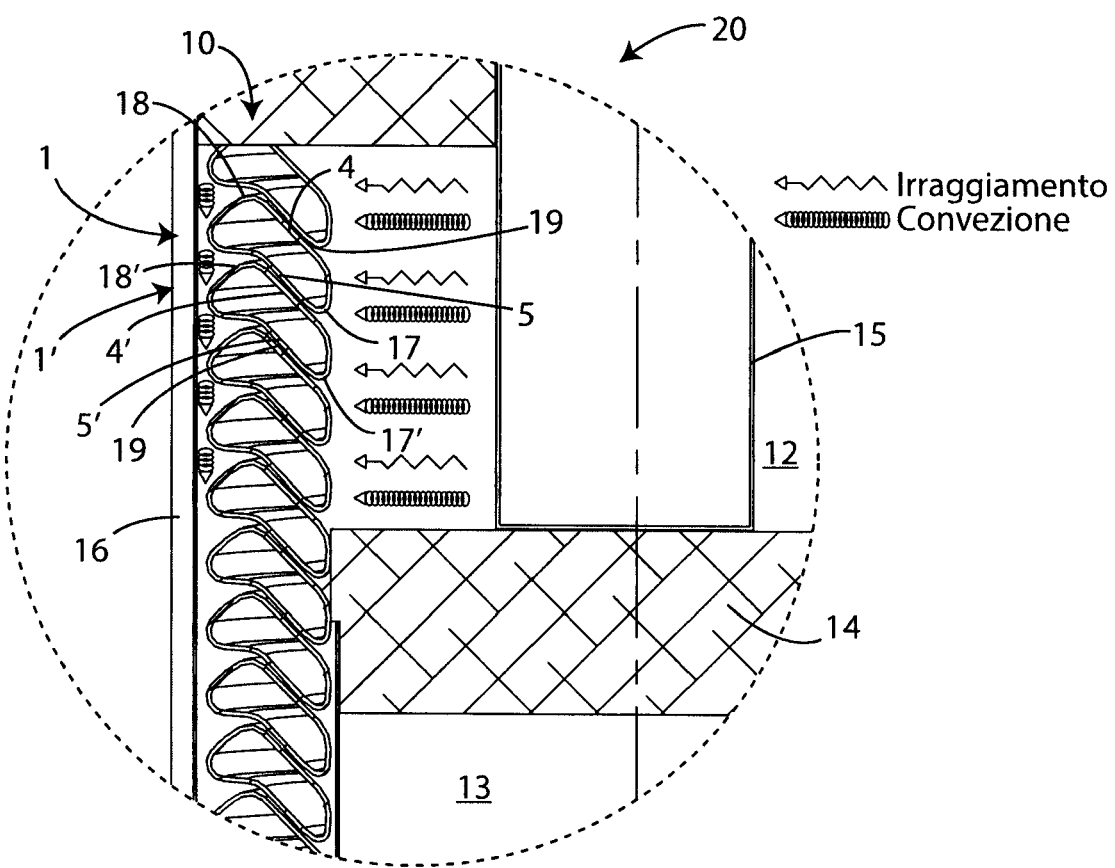
FIG. 5 shows a second detail V of FIG. 3 during the condensation phase of the fumes produced by the burner of the boiler condensing.

Preferably, as shown in FIG. 4, the distance dz between the heat exchanger 10 by the insulating partition 14 is between 0.1 mm and 20 mm. This distance allows drainage of the condensate in correspondence of the condensation zone 13 and a better and efficient heat exchange.

The specific embodiment of the condensation boiler 20 according to the invention has the height of the combustion chamber 12 ranging between 30% and 65% of the height of the boiler 20.

As shown in particular in FIG. 7 in the condensation zone, the last coil can be closed, thus preventing the passage of the fumes (shown with arrows), so as to force them to lap the entire surface of the heat exchanger 10.

Making referring to FIG. 8, the heat exchanger can also be used in a condensation boiler 20 of the horizontal type. In any case, the boiler must be oriented so that the central axis y of the heat exchanger 10 is inclined between 4° and 90°.

Preferred embodiments and variants of the present invention have been suggested in the above, but it is to be understood that one skilled in the art can made modifications and changes, without departing from the relevant scope, as defined in the enclosed claims.

The invention claimed is:

1. A profile of piping, in particular piping for making a heat exchanger for a condensation boiler, wherein the profile has a substantially "P" shaped cross-section, the "P" shaped cross-section of the profile has
    a trapezoidal portion, having two bases and two sides, and
    a triangular portion, having a base and two sides,
    wherein a first side of the trapezoidal portion coincides with the base of the triangular portion, wherein a second side and the bases of the trapezoidal portion and the sides of the triangular portion form the inner walls of the profile, wherein a first angle ($\alpha$) between a first base of the trapezoidal portion and a first side of the triangular portion adjacent to it is between 45° and 135°, wherein a second angle ($\beta$) between a second base of the trapezoidal portion and a second side of the triangular portion adjacent is 225°.

2. The profile according to claim 1, wherein a third angle ($\gamma$) between the first base and the second side of the trapezoidal portion is between 120° and 170°.

3. The profile according to claim 1, wherein contact points for the angles ($\alpha, \beta, \gamma$) between adjacent walls are rounded.

4. A coiled heat exchanger comprising the profile of claim 1 arranged in spiral so as to comprise a plurality of coils winded up one on the other in respect to a central axis (y), wherein the first base of the trapezoidal portion of the profile of each coil is tilted with respect to said central axis (y) of a fourth angle ($\delta$) between 10° and 60°.

5. The coiled heat exchanger according to claim 4, wherein said coils are arranged in such way as to have the second base of the trapezoidal portion of the cross-section of the profile of a first coil parallel to the first base of the trapezoidal portion of the cross-section of the profile of a coil adjacent and separated of a distance ($d_x$) between 0.5 mm and 2 mm.

6. A condensation boiler comprising a coiled heat exchanger according to claim 4.

7. The condensation boiler according to claim 6, comprising a combustion zone, a condensation zone, and a dividing wall between said two zones, wherein, in said condensation zone, said coils are distanced from said dividing wall of one distance ($d_z$) between 0.1 mm and 20 mm.

8. The condensation boiler according to claim 6, comprising an external casing, and wherein each of said coils is distanced from said external casing of one distance ($d_y$) between 0.1 mm and 20 mm.

9. The condensation boiler according to claim 8, comprising a slotted casing between said external casing and said coiled heat exchanger in correspondence of said combustion zone and/or of said condensation zone.

10. The condensation boiler according to claim 7, wherein the height of said combustion zone is between 30% and 65% of the height of the boiler.

11. The condensation boiler according to claim 7, being oriented in such way that the central axis (y) of the coiled heat exchanger is arranged vertically or tilted of an inclination between 4° and 90°.

12. The profile of piping according to claim 1, wherein the first angle ($\alpha$) is 90°.

13. The coiled heat exchanger according to claim 4, wherein the fourth angle ($\delta$) is 45°.

* * * * *